Patented Dec. 16, 1930

1,785,473

UNITED STATES PATENT OFFICE

HOWARD ADLER AND GUY A. McDONALD, OF CHICAGO HEIGHTS, ILLINOIS, ASSIGNORS TO VICTOR CHEMICAL WORKS, A CORPORATION OF ILLINOIS

GRANULAR CALCIUM PHOSPHATE

No Drawing.  Application filed January 7, 1929. Serial No. 330,961.

In the manufacture of mono-calcium phosphate by reaction between lime and phosphoric acid, it is desirable to secure a product which is relatively hard and resistant to abrasion; that is, which, on subjecting it to the ordinary milling operation, will yield the largest possible proportion of granular product suited for the manufacture of phosphate baking powder. When using phosphoric acid obtained by chemical decomposition of natural phosphates with sulfuric acid and subsequent purification, it has been possible to secure a product of sufficient hardness to yield substantial proportions of hard resistant granules of the mono-calcium phosphate product. The proportion of granular phosphate a given product will yield may be approximately estimated by the proportion of the phosphate passing through an 80 mesh screen and remaining on a 150 mesh screen after a double milling operation, as more fully set forth hereinafter. The actual commercial product marketed may include finer particles or granules.

Phosphoric acid made by chemical decomposition as above referred to contains appreciable amounts of impurities even after extensive chemical purification, for example, phosphates of iron, aluminum and other metals. Recently it has been found desirable to produce a phosphate for use in baking powders, having a greater purity than is economically obtainable by the use of phosphoric acid produced by the acid decomposition process. For this reason it is desirable to employ, in the manufacture of the mono-calcium phosphate, phosphoric acid derived from the volatilization processes and particularly from the blast or electric furnace process. Such acids contain relatively minute proportions of impurities, but the mono-calcium phosphate produced therefrom is soft and of low resistance, and unadapted for the commercial production of a mono-calcium phosphate suitable for use in baking powders. By reason of its purity, the mono-calcium phosphate produced from the purer acid from the volatilization processes is desirable for food purposes. Thus mono-calcium phosphates produced from phosphoric acid from acid decomposition of natural phosphates have been found from a large number of analyses to contain from 0.75% to as high as 3% of iron phosphate, whereas the like products derived from acids resulting from the volatilization processes contain a maximum of 0.50% of iron phosphate. A typical analysis of a mono-calcium phosphate derived entirely from volatilzation acid contains 0.22% to 0.35% iron phosphate.

It is thus apparent that the type of phosphoric acid, which is highly desirable for the purpose, is not adapted to the manufacture of granular mono-calcium phosphate suitable for use in baking powders. It has now been found that substantially increased, commercially available proportions of hard, resistant granular mono-calcium phosphate may be produced from the purer and more desirable forms of phosphoric acid above referred to by incorporating therein during the process of manufacture, from 0.6% to 2.0% magnesium compounds (calculated as MgO). Preferably, from 0.75 to 1.5% magnesium compounds (calculated as MgO) are so incorporated. The magnesium compound is, it is believed, present as magnesium phosphate in the final phosphate product. It may be dissolved in the phosphoric acid used, or incorporated during the reaction between phosphoric acid and the lime to produce the mono-calcium phosphate. For example, a desired quantity of magnesium oxide or magnesium carbonate is introduced into the reaction mixture; or, instead of the chemical lime ordinarily used, there may be employed a special lime prepared from a dolomitic limestone to contain from 4 to 5% MgO. The reaction is carried out in the usual manner, by direct reaction of hydrated lime, quick lime, carbonate of lime or other suitable lime salt with diluted phosphoric acid, the proportions being calculated to provide sufficient calcium and magnesium to replace one hydrogen atom of each molecule of the phosphoric acid, sufficient of the magnesium compound being incorporated to yield the desired proportion in the final product. Thus, in such a reacting batch, magnesium oxide or magnesium carbonate may be added during reaction in quantity to produce say 1.0 to 1.5% MgO in the final product, the reaction continued in the usual way and the resulting mono-calcium phosphate concentrated and dried in any suitable manner, as by vacuum or spray drying.

A laboratory test of the approximate hardness and resistance of the calcium phosphate may be made by milling the phosphate product for a fixed period of time, say 20 minutes, in a laboratory ball mill, suitably a one-quart size; screening the milled product, saving the portion passing through an 80 mesh screen and retained by a 100 mesh screen. The tailings are remilled until all pass the 80 mesh screen. The collected portions passing the 80 mesh screen and retained on the 100 mesh screen are again milled for 20 minutes and rescreened. The portion of the remilled material passing through an 80 mesh screen and retained on a 150 mesh screen, as compared with that portion passing through a 150 mesh screen may be regarded as an indication of the relative effectiveness of the process of manufacture for producing a granular calcium phosphate. This method does not indicate accurately the amount of the granular type of the phosphate which will be produced in plant operation, but by using a standardized method of manipulation, the figures obtained are found to have a definite relation to the proportions of granular phosphates secured in plant operation.

Employing the above described method of laboratory manipulation as an index, it has been found that a pure phosphoric acid derived from a volatilization process, and without the addition of magnesium compounds of the 80–100 mesh portion from the first milling, approximately 45%, on the second milling, passed through the 150 mesh screen. On a second batch in which 0.6% MgO had been incorporated, the portion of the same fraction passing through the 150 mesh screen after the second milling was reduced to below 40%. In a batch in which 1% MgO was incorporated, on similar treatment, after remilling the 80–100 portion obtained from the first milling operation, approximately 25% passed through the 150 mesh screen. With 2% MgO, the proportion on remilling passing through the 150 mesh screen was slightly increased. In the commercial operations, the method of handling the mono-calcium phosphate product and of separating the granular portions from the pulverized portions is that which is customarily employed, the product being subjected to the usual milling operation and screening, the coarser products retained say on a 200 mesh sieve forming the granular product and the finer material, largely passing through the 200 mesh screen forming the regular product.

The present invention may also be employed in other circumstances where undesirably low proportions of granular phosphate (say below 10% of the total) are formed in the manufacture of mono-calcium phosphate, as when substantial proportions of phosphoric acid from the volatilization processes are mixed with acid from the acid decomposition process. The incorporation of sufficient magnesium compounds to bring the total to 0.6 to 2% MgO, in accordance with this invention, substantially increases the hardness and resistance of the mono-calcium phosphate and makes possible a substantial increase in the proportion of granular mono-calcium phosphate obtained.

We claim:
1. A mechanically resistant mono-calcium phosphate containing less than 0.5% iron phosphate, and from 0.6 to 2% MgO.
2. A mechanically resistant mono-calcium phosphate containing less than 0.5% iron phosphate, and from 0.75 to 1.5% MgO.
3. The method of forming mono-calcium phosphate from purer forms of phosphoric acid low in metallic phosphates to increase the proportion of granular, mechanically resistant product obtainable, which comprises incorporating therein during manufacture from 0.6 to 2% MgO.
4. The method of forming mono-calcium phosphate from purer forms of phosphoric acid low in metallic phosphates to increase the proportion of granular, mechanically resistant product obtainable, which comprises incorporating therein during manufacture from 1.0 to 1.5% MgO.
5. In the method of forming mono-calcium phosphate from purer forms of phosphoric acid, the step of increasing the proportion of granular, mechanically resistant product obtainable, which consists in reacting upon a lime compound with such phosphoric acid in the presence of a magnesium compound in quantity to supply 0.6 to 2% MgO in the product.

In testimony whereof we have hereunto set our hands this 26th day of December, 1928.

HOWARD ADLER.
GUY A. McDONALD.